Nov. 1, 1932.  W. S. BRUBAKER  1,885,680
RESETTABLE COUNTER
Filed March 28, 1929  4 Sheets-Sheet 1
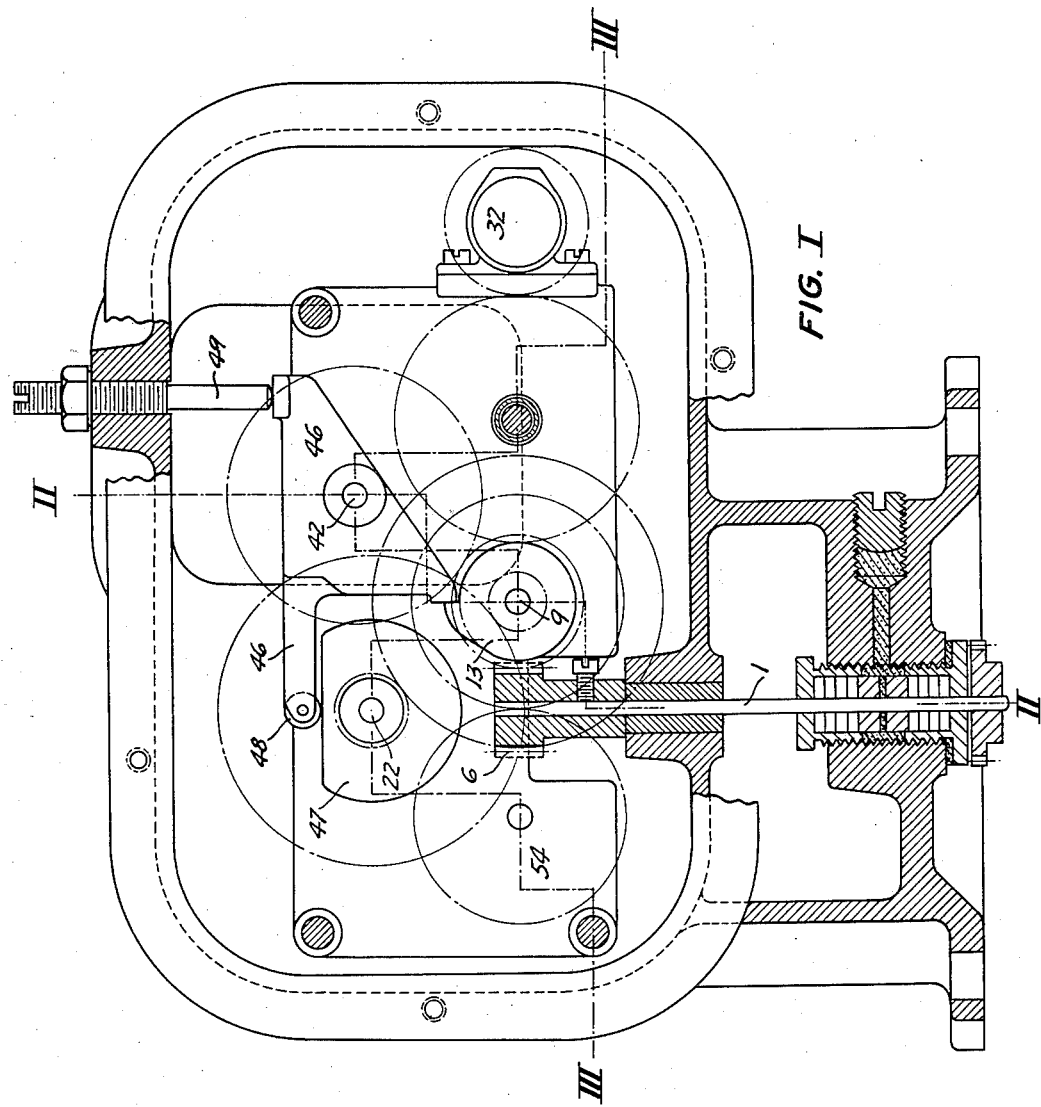
FIG. I
INVENTOR
WALTER S. BRUBAKER
BY Eugene C. Gott, Jr.
ATTORNEY Nov. 1, 1932.  W. S. BRUBAKER  1,885,680
RESETTABLE COUNTER
Filed March 28, 1929  4 Sheets-Sheet 2
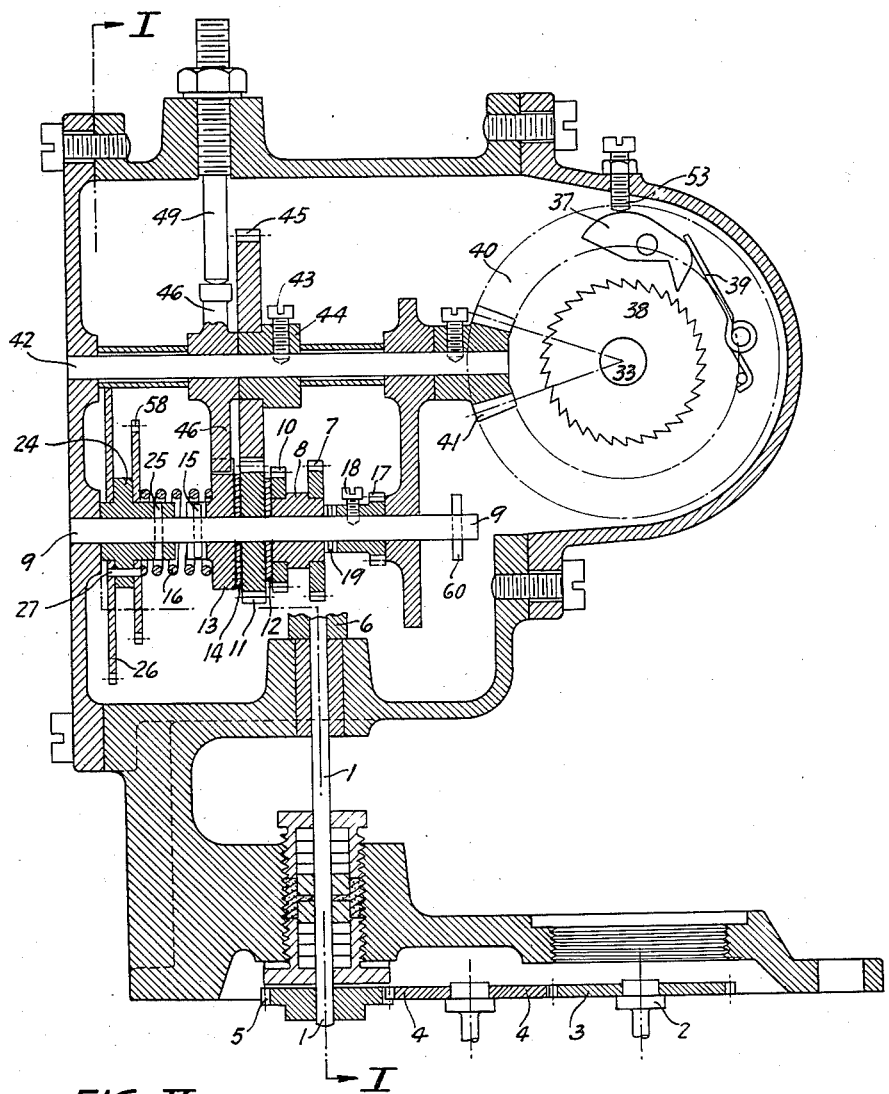
FIG. II
INVENTOR
WALTER S. BRUBAKER
BY Eugene C. Gott, Jr.
ATTORNEY Nov. 1, 1932.  W. S. BRUBAKER  1,885,680
RESETTABLE COUNTER
Filed March 28, 1929   4 Sheets-Sheet 3
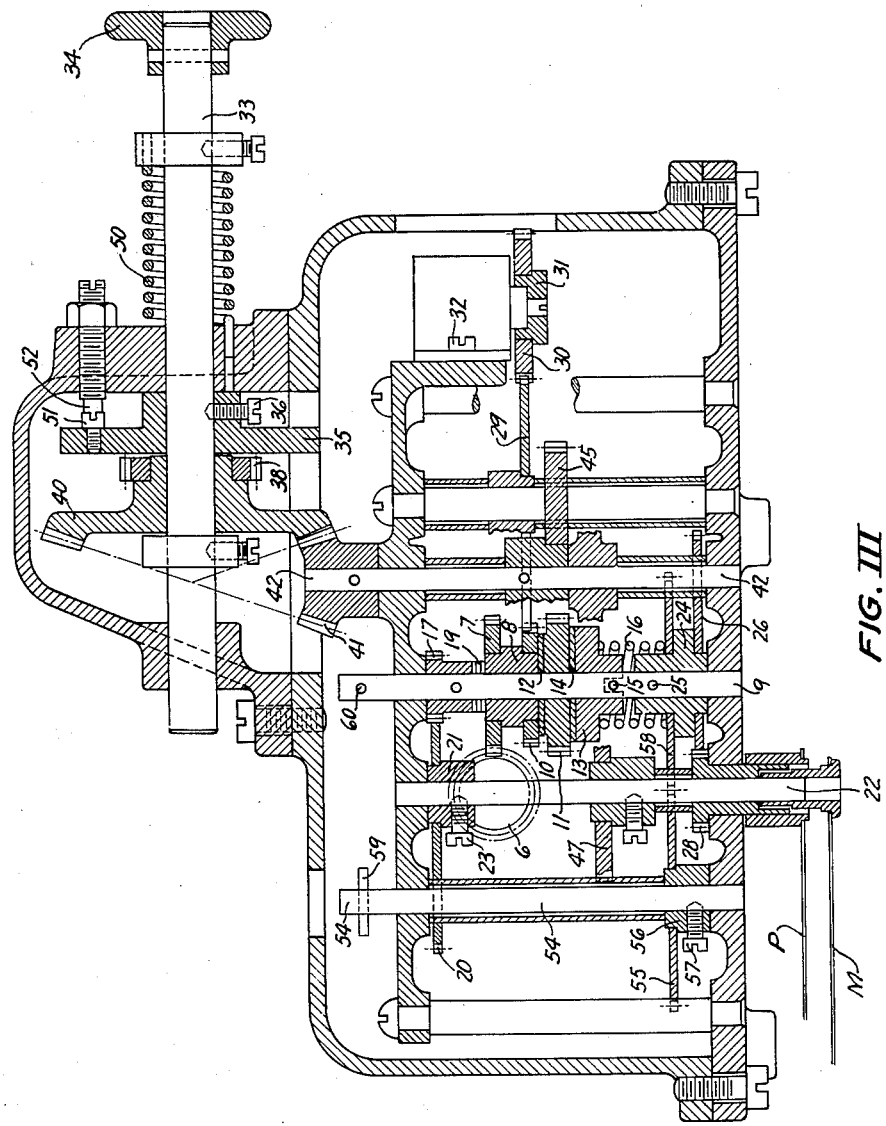
FIG. III
INVENTOR
WALTER S. BRUBAKER
BY Eugene C. Gott, Jr.
ATTORNEY

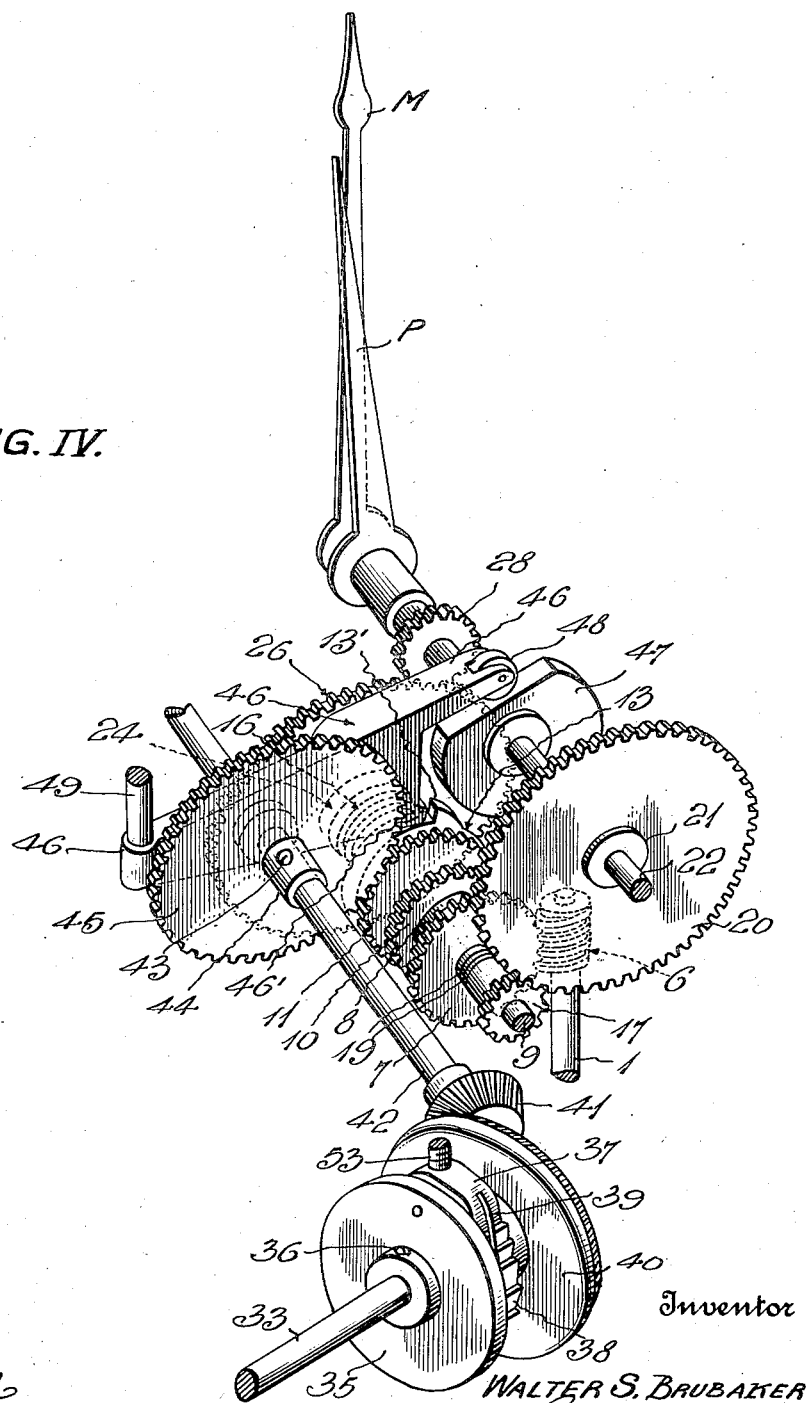

Patented Nov. 1, 1932

1,885,680

UNITED STATES PATENT OFFICE

WALTER S. BRUBAKER, OF OAKLAND, CALIFORNIA, ASSIGNOR TO GRANBERG METER CORPORATION, OF SAN FRANCISCO, CALIFORNIA, A CORPORATION OF CALIFORNIA

RESETTABLE COUNTER

Application filed March 28, 1929. Serial No. 350,644.

This invention relates to that class of machines which are employed to register by indication upon a dial the number of revolutions or other operative movements made by working machines, to which this invention is attached for the purpose of recording the number of its movements.

It is the principal object of this invention to provide a counter for a liquid meter on which the quantity of liquid dispensed, as at gasoline filling stations, is indicated to the purchaser in units, or fractions of units, of volume or multiples thereof. The registration is also made of the total volume delivered through the dispensing apparatus.

The further object of this invention is to provide a simple and compact mechanism adapted to be connected to a liquid meter which will indicate or register the volume of liquid dispensed at each sale or operation in the fractional unit volume and multiples of unit volume and which may be set back to zero quickly and accurately after each dispensing operation without disturbing the totalizer.

Still further objects are to provide unique and advantageous means for resetting the register or counter; to provide novel stop means for limiting the resetting movement; to provide for accurate adjustment of said stop means; to provide both the register driving means and the resetting means with frictional driving connections having such relative strengths that the fractional connection of the resetting means may effect resetting movement of parts while the frictional connection of the driving means slips, but will itself slip if the resetting means be further operated when the aforesaid stop means functions; and to provide an advantageous general construction which readily allows easy assembly and disassembly.

This invention will be described more fully hereinafter with reference to the accompanying drawings in which it is illustrated and in which:

Figure I is the front elevation of the counter with the front plate removed and partly in section as indicated by line I—I of Figure II;

Figure II is a vertical section of the counter taken on the line II—II of Figure I;

Figure III is the horizontal section of the counter through the various shafts as indicated by the line III—III of Figure I; and Figure IV is a fragmentary perspective view of most of the working parts.

In the embodiment of the invention illustrated there is shown at the bottom a portion of the counter which rests on a meter of well known construction, with which the improved counter is associated and from which it is driven through a drive shaft 1, which in turn is driven by the meter shaft 2, through the gear train 3—4—5. The registering mechanism is suitably enclosed in a casing which supports a dial (not shown) graduated to read the movements of the pointers or indicator hands.

On the upper end of the counter drive shaft 1, there is a worm 6 which engages the worm wheel 7, pressed on a hub 8. The hub is free to rotate on the counter shaft 9 and the rotation of the worm wheel 7 is transmitted to the countershaft 9, through a frictional connection. This connection is obtained by means of a gear 10, also on the hub 8, transmitting its rotary motion to a gear 11 through a frictional washer 12, the gear 11 in turn transmitting its motion to a cam collar 13 through a larger frictional washer 14, the cam collar 13 being slidably keyed to the shaft 9 by a pin 15. The hub of the cam collar 13 is slotted and the pin 15 in the slot transmits the rotation of the cam collar 13 to the counter shaft 9 and also allows the cam collar 13 to move longitudinally on the shaft, thereby transmitting the pressure exerted by the spring 16 to force the parts 14, 11, 12, 10, 8 and 7 toward a fixed shoulder on shaft 9, said shoulder being, in the present disclosure, formed by a pinion 17.

The pinion 17 is secured to the counter shaft 9 by the set screw 18, (Fig. II) and is separated from the hub 8 by the washers 19 which are practically frictionless. The pinion 17 is shown more clearly in Figures III and IV, engaged with the gear 20 on the hub 21, which is secured to the pointer carrying shaft 22 by means of a set screw 23. The multiple unit pointer M is attached to the end of shaft 22 as shown.

A hub 24 (Figs. III and IV) is secured to the counter shaft 9, with a pin 25, and a gear 26 is fastened to the hub 24 with a pin 27 (Fig. II). The gear 26 engages a pinion 28 mounted on and rotatable with respect to shaft 22, said pinion having the unit pointer P attached thereto.

The gear 10 on the hub 8 is engaged with an idler gear 29, which in turn engages the drive gear 30 mounted on the hub 31, to drive the totalizer 32.

The return of the multiple pointer M and the unit pointer P to zero is accomplished by a resetting mechanism actuated by a reset shaft 33 (Figs. II, III and IV) manually operated by a handle 34. A pawl-carrying disk 35 (Figs. III and IV) is secured to the reset shaft 33 by set screw 36 and carries a pawl 37 (Figs. II and IV) which is urged toward rachet 38 by the spring 39. The ratchet 38 is pressed on the hub of a bevel gear 40 which is free to rotate on the reset shaft 33 and meshes constantly with a bevel gear 41 which is secured to the intermediate shaft 42. Secured on this intermediate shaft 42 with a set screw 43 (Figs. II and IV) is a hub 44 on which a gear 45 is securely pressed, said gear 45 engaging with the gear 11.

The gear 11 is loose on the counter shaft 9 and transmits resetting rotation through frictional washer 14 to the cam collar 13, the washer 14 overcoming the washer 12, when the hub 8 is held by the worm 6 and the worm wheel 7, which permits the totalizer 32 to remain stationary.

Then the movement of the handle 34 is transmitted to the counter shaft 9, which will return the multiple pointer M and the unit pointer P to zero through the gears 17 and 20 and 26 and 28 respectively.

In order to prevent the pointers from passing the zero mark the set back mechanism is provided with unique stop means. A stop 13' is carried by the cam collar 13 which rotates bodily with the shaft 9. A relatively stationary stop 46 having a nose 46' for co-action with the stop 13', is loosely pivoted on shaft 42, being urged by gravity toward a position at which said nose 46' is in the path of the stop 13', this position being shown in Figs. I and IV. When nose 46' is against stop 13', both pointers M and P are at zero. Upon starting of the next registering operation, stop 13' moves away from nose 46' and a cam 47 on the slowly moving multiple pointer shaft 22, swings the stop 46 to a position at which its nose 46' is out of the path of the stop 13'. Cam 47 holds the stop 46 in this retracted position while shaft 22 is making almost a complete revolution and the rapidly rotating pointer hub or pinion 28 is making a plurality of revolutions. In the present showing, while the rapidly moving unit pointer P is making twenty revolutions, the slowly moving multiple pointer M is making only one revolution and by the time these pointers have about completed these revolutions respectively, cam 47 will have allowed stop 46 to drop until nose 46' rests upon the cam-like collar 13, and if the registering operation be then further prolonged to bring both pointers back to or past zero, nose 46' will drop when stop 13' passes, and cam 47 will then again raise and hold stop 46, as before. If the registering operation be discontinued before the pointer M has made a complete revolution, which is usually the case, stop 46 will be held raised by cam 47 when resetting. While the shaft 9 is being rapidly turned retrogradely and shaft 22 slowly turned retrogradely (due to the gearing connecting them), cam 47 will hold stop 46 raised, until the slowly moving pointer M has almost completed its resetting movement and pointer P is making its last resetting revolution. Then, cam 47 allows stop 46 to drop and nose 46' is thus disposed in the path of stop 13'. The result is that when both pointers M and P have been reset to zero, stop 13' strikes nose 46' and the resetting operation is stopped. Since the pointers M and P are geared together in invariable synchronism and relatively set at the factory so that when pointer M is at zero, pointer P will also be there, it follows that stopping the resetting operation when M is at zero will also stop P at its zero setting.

During resetting, in which the rearward-driving or resetting gear 11 is driven by gear 45, the frictional driving connection between the forward-driving gear 7 and shaft 9 slips, and the frictional driving connection between said gear 11 and the shaft 9, drives the latter to reset the pointers M and P. If the resetting means be further operated after the stop 13' strikes the nose 46', the frictional connection between gear 11 and shaft 9 will slip, preventing possible injury to parts.

One end of the stop 46 is preferably provided with a roller 48 engaging the cam 47. Normally abutting the other end of the stop 46 is a set screw 49. In view of the fact that the nose 46' is spaced from the pivot of the stop 46, swinging of the latter by means of screw 49 will move said nose to a position at which it will be struck sooner or later by the stop 13', thereby aiding in initially adjusting the register or in adjusting to compensate for wear of 13' and 46'.

The torsion spring 50 (Fig. III) will at all times have a tendency to turn the set back shaft 33 and disk 35 until the head of the screw 51 on said disk, hits the end of the stop screw 52 (Fig. III). If the hands of the counter are already at the zero mark on the dial and the set back should be turned, then the two friction washers 12 and 14 next to the gear 11 would prevent damage to the counter or meter by permitting the gear 11 to turn. The purpose of the kick out screw 53 is to disengage the pawl 37 from the ratchet when the hub 35 reaches a resting position shown in Figure II, so that the gear 40 is unclutched from the shaft 33 and the set back mechanism will not interfere with operation of the registering mechanism, (pointers M and P, totalizer 32 and their driving means).

In the event it is necessary to use two counters with but a single meter the second counter is driven from shaft 54. This shaft is driven through a gear 55 which is pressed on a hub 56 (Fig. III), secured to the shaft 54 with a set screw 57. Gear 55 is enmeshed with a gear 58 (omitted from Fig. IV) which is pinned to hub 24 with the pin 27. Both shafts 9 and 54 have the same speed. A tubular connecting shaft (not shown) for driving the additional counter (not shown) may fit over shaft 54 and be driven with the aid of a pin 59. The second counter may contain only the gearing required to drive the pointers, no setback mechanism being necessary, as the pointers are reset from the first counter through the counter shaft 9.

It will be seen from the foregoing that a very efficient and desirable register has been provided from both the standpoint of use and manufacture. The front plate F is removably secured to the casing C by screws F' and it carries the entire registering mechanism so that this mechanism may be removed bodily with said front plate for inspection or repair. The back plate R' of the register frame R is notched at N (Fig. I) to clear the worm 6 upon removal of the screws F' and the adjusting screw 49, and slight upward shifting of said frame R. The setback shaft 33 and associated parts (Fig. III) are carried by an auxiliary casing C' detachably secured to the back of the casing C by screws C². The auxiliary casing C' covers an opening O in the back wall of the casing C, and the gear 40 and pinion 41 mesh at this opening. Upon removal of the auxiliary casing C' and parts carried thereby, gear 40 merely unmeshes from pinion 41, and such removal gives easy access to the setback mechanism for inspection or repair.

What is claimed is:—

1. In a resettable register, a rapidly rotatable unit pointer, a slowly rotatable multiple pointer, driving means for maintaining invariable synchronism of said pointers, a rotary stop permanently synchronized with said pointers, a relatively stationary stop mounted for movement into and out of the path of said rotary stop and adapted to co-act with the latter in limiting resetting movement, and a rotary cam synchronized with said pointers for holding said relatively stationary stop out of the path of said rotary stop until said multiple pointer reaches substantially the end of its resetting movement and said unit pointer is making its last resetting revolution.

2. In a resettable register, a pointer shaft, a pointer hub loose on said shaft, a second shaft parallel with said pointer shaft, driving connections between said second shaft and said pointer shaft and hub for rotating said pointer shaft and hub at different permanently synchronized speeds, a stop rotatable bodily with said second shaft, a relatively stationary stop mounted for movement into and out of the path of said rotatable stop and adapted to co-act with the latter in limiting resetting movement, and a cam rotatable bodily with said pointer shaft for holding said movable stop out of said path of said rotatable stop until said pointer shaft reaches substantially the end of its resetting movement and said pointer hub is making its last resetting revolution.

3. In a resettable register, reset limiting means embodying a rotary stop, a relatively stationary pivotally mounted stop having a nose spaced from its pivot for co-action with said movable stop, the pivot of said stationary stop being parallel with the axis of rotation of said rotary stop and disposed to cause movement of said nose obliquely of the circular path of said rotary stop when said stationary stop swings on its pivot, and an adjusting device for swinging said pivotally mounted stop about its pivot to slightly adjust said nose with respect to the length of said path of said movable stop.

WALTER S. BRUBAKER.